United States Patent [19]

Weis

[11] 4,440,289

[45] Apr. 3, 1984

[54] DISCRETE ARTICLE TRANSPORT AND CONSOLIDATING SYSTEM

[75] Inventor: Rudolf R. Weis, Antioch, Calif.

[73] Assignee: Crown Zellerbach Corporation, San Francisco, Calif.

[21] Appl. No.: 332,419

[22] Filed: Dec. 21, 1981

[51] Int. Cl.³ .............................................. B65G 47/68
[52] U.S. Cl. ..................................... 198/448; 198/437
[58] Field of Search ............... 198/367, 372, 436, 437, 198/448

[56] References Cited

U.S. PATENT DOCUMENTS

| | | | |
|---|---|---|---|
| 2,726,751 | 12/1955 | Levitt | 198/437 |
| 2,916,792 | 12/1959 | Crook et al. | 198/572 |
| 3,045,801 | 7/1962 | Graybeal | 198/372 |
| 3,311,217 | 3/1967 | Muhlenbruch | 198/436 |
| 3,866,739 | 2/1975 | Sikorski | 198/453 |
| 3,942,623 | 3/1976 | Church et al. | 198/448 |

FOREIGN PATENT DOCUMENTS 57-81019  5/1982  Japan .................................. 198/448

Primary Examiner—Joseph E. Valenza
Assistant Examiner—Daniel Alexander
Attorney, Agent, or Firm—Thomas R. Lampe

[57] ABSTRACT

A system for transporting discrete articles such as paper roll products in a predetermined number of flow lines and consolidating the articles into a lesser number of flow lines.

3 Claims, 6 Drawing Figures

DISCRETE ARTICLE TRANSPORT AND CONSOLIDATING SYSTEM

BACKGROUND OF INVENTION

1. Field of Invention

This invention relates to a system for transporting discrete articles such as rolls of paper towels or tissue, and during the course of such transport consolidating the articles from a predetermined number of flow paths upstream from the system into a lesser number of flow paths.

2. Description of the Prior Art

It is sometimes desirable to consolidate several lines of transported discrete articles into a lesser number of lines. For example, such consolidation is necessary when downstream equipment does not have the capability of handling the same number of lines of discrete articles as upstream equipment. In the field of paper converting such a problem has been encountered wherein an orbital saw is capable of cutting three or more logs of tissue or toweling into separate rolls disposed in three lines but downstream wrapper equipment can only handle a two lane input. This has necessitated developing a simple system to consolidate the rolls into two lines during transport. Prior to this development such task was often handled manually thus adding to the labor costs involved in the production of the finished product. While consolidating machinery does exist it is characterized by its relatively high cost and complexity.

BRIEF SUMMARY OF THE INVENTION

According to the teachings of the present invention a plurality of conveyors is provided upon which the discrete articles are introduced in spaced linear relationship. To consolidate the articles into a lesser number of lines at least one of the conveyors is operated at a speed differing from the speed of the other conveyors to move the articles on the differential speed conveyor out of side by side relationship with the other articles. Diverter means is then provided for displacing the articles transported by the differential speed conveyor after they have been moved out of side by side relationship with the other articles. The displaced articles are positioned in linear aligment with the articles of adjacent conveyors thereby resulting in a lesser number of lines of moving goods.

DETAILED DESCRIPTION

Figure 1:
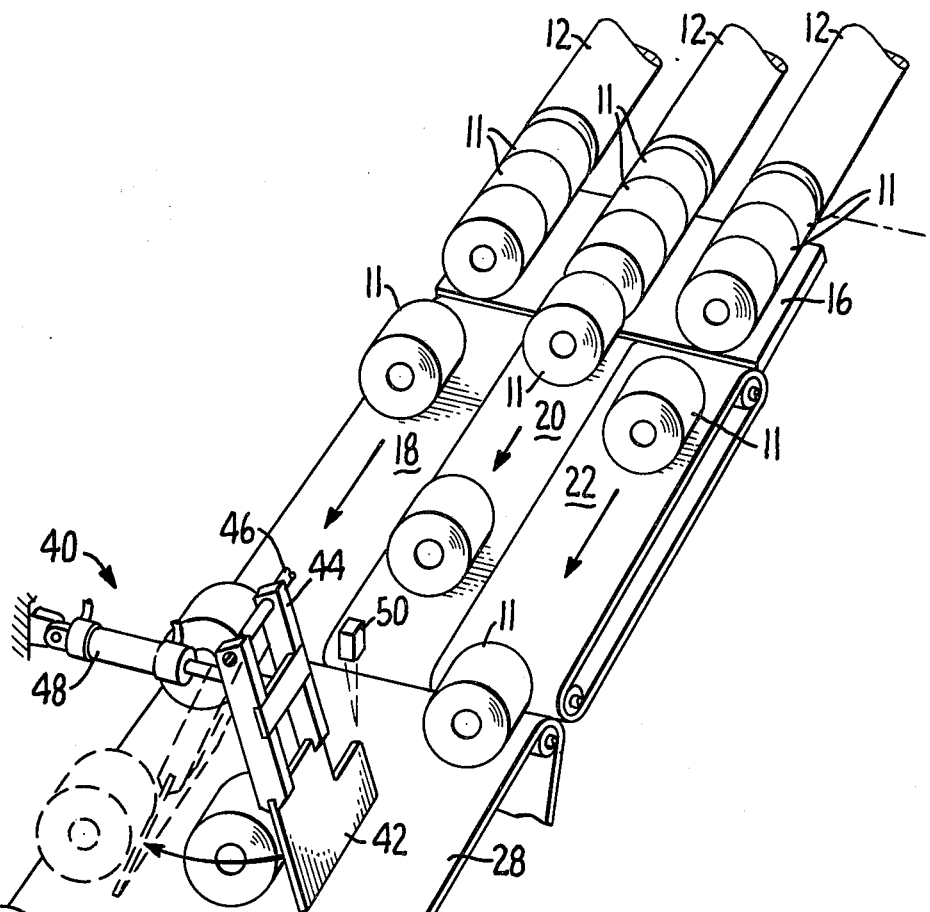
FIG. 1 is a perpective view of apparatus constructed in accordance with the teachings of the present invention.

Referring now to FIG. 1, apparatus constructed in accordance with the teachings of the present invention is shown being utilized to transport and consolidate rolls 11 of paper product such as tissue or toweling. It will be appreciated, however, that the principles of the present invention may be applied to any discrete article. The rolls 11 are conventionally formed by being cut from elongated logs or cants 12 by means of any suitable saw equipment such as orbital saw 14 which is illustrated diagramatically in FIGS. 2-4. In the disclosed arrangement three such cants 12 are illustrated; therefore, three rows or lines of rolls 11 are formed during the sawing operation.

Wrapping equipment disposed downstream from the orbital saw is for purposes of illustration in connection with this invention presumed to be capable of handling only two lines of product. Thus, it is the function of the apparatus illustrated and to be described herein below to consolidate the three initial lines of rolls into two lines without the use of complicated equipment or manual assistance.

Figure 6:
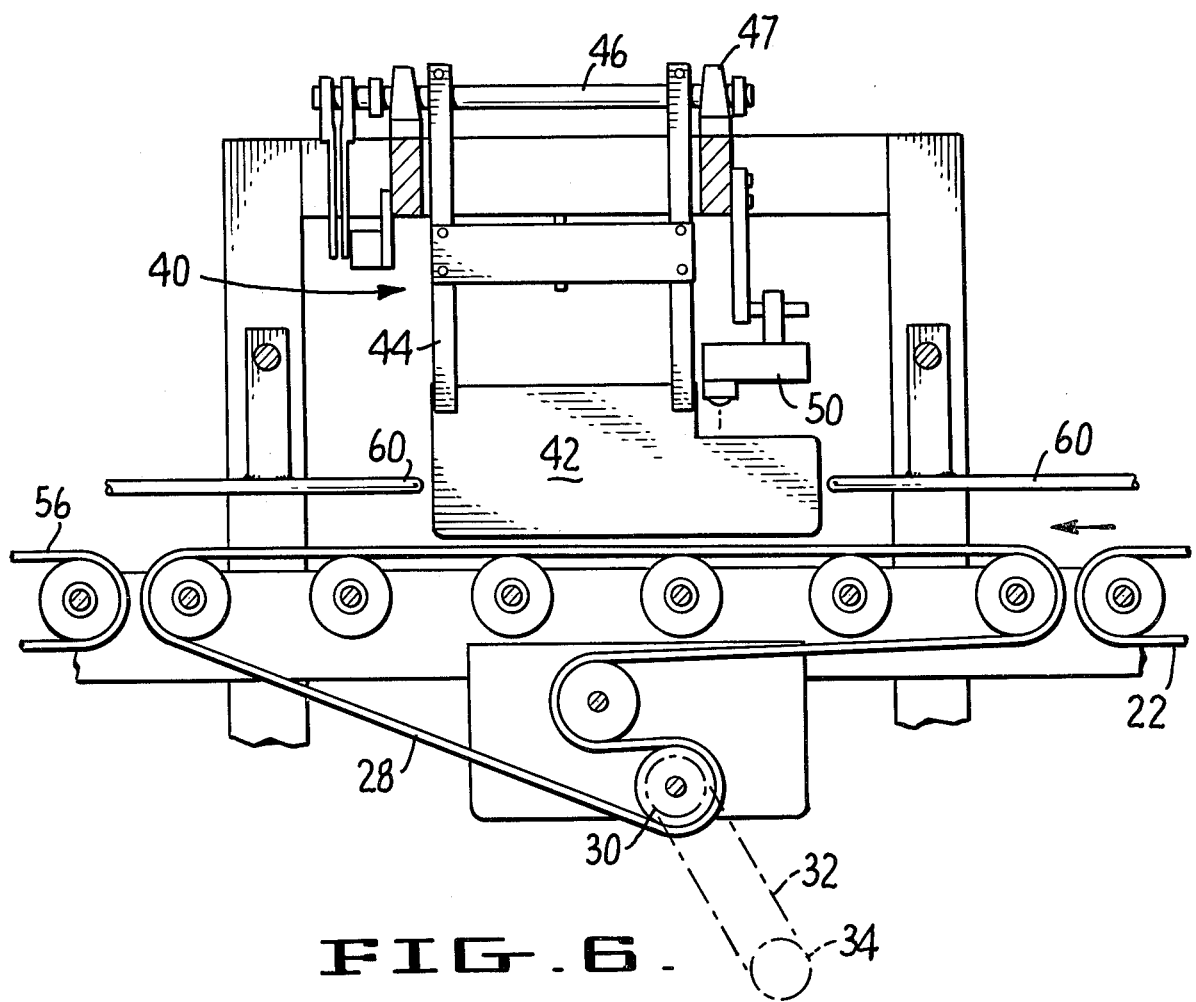
FIG. 6 is a side view of selected portions of the apparatus.

As the rolls 11 are fed from the orbital saw they are pushed across a platform 16 which leads to the input end of three belt conveyors 18, 20 and 22 disposed in parallel and driven by any suitable drive mechanism (not shown) so that the middle conveyor 20 is a differential speed conveyor being driven at a different speed than are conveyors 18 and 22. Conveyors 18 and 22, on the other hand, are both driven at the same speed. In the arrangement illustrated, differential speed conveyor 20 is driven at a somewhat slower speed than are conveyors 18 and 22. Thus, when the three end rolls 11 are pushed off platform 16 onto the conveyor surfaces the middle roll will be repositioned with respect to the two outer rolls. That is, from a side-by-side relationship the middle roll 11 will gradually change its position so that it registers with the gaps between the rolls on each of the two outer conveyors. After conveyors 18, 20 and 22 have accomplished this function the rolls are discharged to an independently movable conveyor stage whereat the rolls are maintained in the staggered relationship that has been established by conveyors 18, 20 and 22. This second conveyor is identified by reference numeral 28 and may comprise a unitary belt as shown or three belts equal in width to conveyors 18, 20 and 22 but driven at identical speeds so that the rolls 11 placed thereon maintain the precise staggered relationship established by conveyors 18, 20 and 22. As may best be seen in FIG. 6, second conveyor belt 28 is disposed about a plurality of support rollers, one of which, roller 30, is driven by belt 32 connected to the drive shaft 34 of a prime mover of any suitable type, which as stated above, is independent of the drive means for conveyors 18, 20 and 22.

Diverter means 40 is provided for diverting rolls 11 previously carried by differential speed conveyor 20 laterally so that the rolls are displaced into linear alignment with the rolls moved by conveyors 18 and 22. This is due to the fact that the rolls previously on the differential speed conveyor 20 are staggered relative to the rolls on the conveyors 18 and 22 and may readily be displaced into the gaps between the rolls delivered by conveyors 18 and 22. In other words, the rolls 11 are consolidated into two lanes from the original three.

Figure 2:
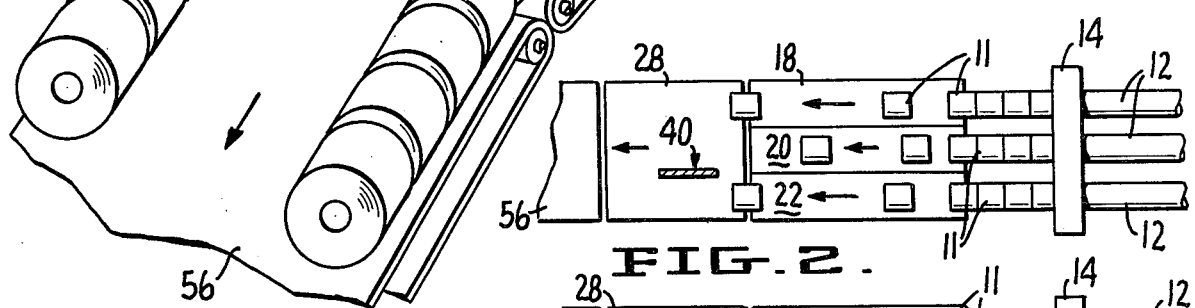
FIGS. 2-4 are schematic plan views illustrating the operation of the apparatus in sequential stages.
Figure 3:
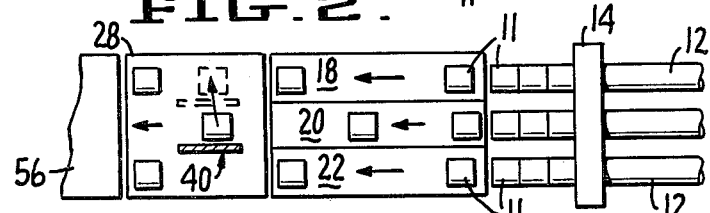
Figure 4:
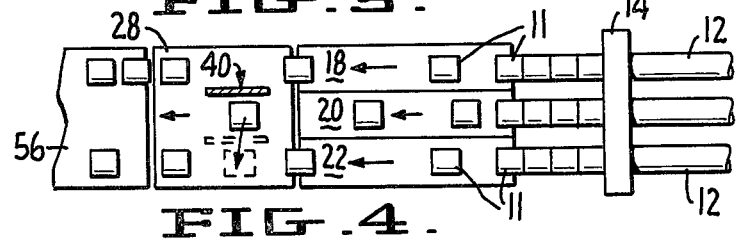

The diverter means comprises a plate 42 mounted on a framework 44 that is in turn mounted for pivotal movement to a shaft 46 rotatably journalled on a suitable mounting support 47. A prime mover in the form of an air cylinder 48 is provided to effect back and forth movement of the framework 44 and plate 42 so that the plate sweeps to and fro over the central portion of second conveyor 28. A control mechanism of any suitable type is employed to actuate prime mover 48 so that plate 42 makes its move when a roll 11 disposed in the center of second conveyor 28 is in registry with the diverter means. For example, the diverter means could operate at a uniformly timed cycle corresponding exactly to the rate at which rolls 11 are introduced onto the conveyor system by orbital saw 14. It is, however, considered more reliable and more desirable to have a sensing means 50 disposed over the center of conveyor 28 to detect the presence of a roll just prior to its being placed into registry with the diverter means. One suitable sensing means that has been employed is a Banner No. CV-A3 convergent beam proximity scanner. A suitable valving arrangement well within the capabilities of a skilled practitioner in the art would of course be controlled by the sensing means 50 to effect movement of the plate 42 in one direction for one roll and in movement thereof in the other direction for the following roll so that alternate rolls are delivered to opposite sides of conveyor 28. Conveyor 28 then delivers the two lines of rolls to a suitable delivery location such as accumulator conveyor 56 so that the rolls may be wrapped, banded or subjected to other desired operations. FIGS. 2-4 illustrate schematically the operation of the present system.

Figure 5:
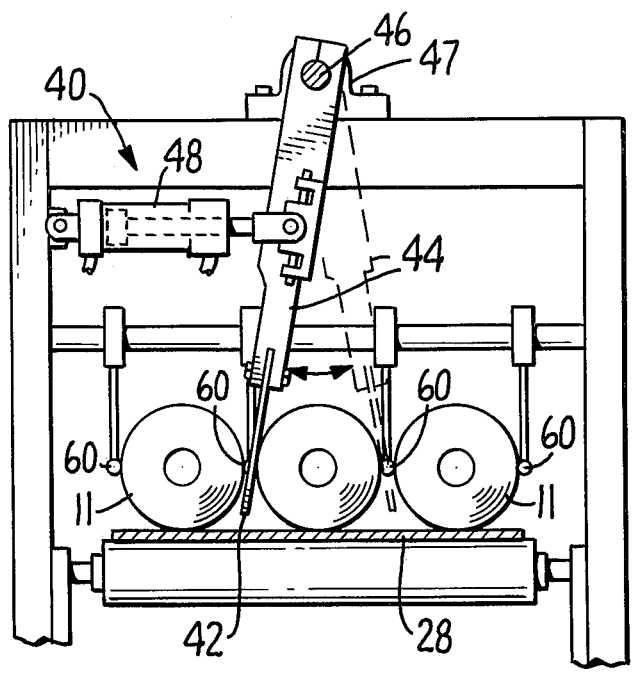
FIG. 5 is an end view showing operational details of the apparatus.

It is preferred that means be employed to maintain the rolls 11 on the various conveyors as desired. For example, referring to FIGS. 5 and 6, suitable adjustable guide rails 60 may be employed for this purpose, it being understood of course that in the vicinity of diverter means 40 no guide rails 60 would exist at the sides of second conveyor 28 to impede movement of the rolls 11 thereon by the diverter means. Rather than employ guide rails, or perhaps supplemental thereto, the conveyors themselves may be constructed in such a manner as to maintain the rolls 11 centered thereon. For example, raised flanges might be employed along the edges of the conveyors or the conveyors themselves might each comprise spaced narrow belts running in unison and defining a "pocket" therebetween to maintain the rolls 11 centered.

I claim:

1. In combination:
    a plurality of conveyors including an inner conveyor and outer conveyors disposed on opposite sides of said inner conveyor and parallel thereto for receiving discrete articles disposed generally side by side and transporting and consolidating said articles, said inner conveyor comprising a differential speed conveyor operating at a speed differing from the speed of said outer conveyors to move the articles on said inner differential speed conveyor out of side by side relationship with the articles on said outer conveyors; and
    diverter means for engaging articles moved by the inner differential speed conveyor after they are moved out of said side by side relationship and displacing said articles into linear alignment with the articles moved by said outer conveyors, said diverter means comprising a reciprocal member for engaging articles moved by said inner differential speed conveyor and positively displacing said articles laterally and prime mover means connected to said reciprocal member for effecting back and forth movement thereof whereby articles engaged thereby are displaced to opposite sides of said inner differential speed conveyor onto said outer conveyors.

2. A method of consolidating descrete articles being conveyed along a predetermined number of flow paths in side by side relationship into a lesser number of flow paths, comprising the steps of:
    serially positioning said discrete articles in generally side by side relationship on an inner moving support surface and outer moving support surfaces disposed on opposite sides of said inner moving support surface and parallel thereto;
    moving said inner support surface at a differential surface speed differing from the surface speeds of said outer support surfaces to move the articles on said inner differential speed support surface out of side by side relationship with articles on said outer support surfaces;
    displacing the articles moved by the inner differential speed support surface after the articles thereon have been moved out of side by side relationship with articles on said outer support surfaces by exerting force on each article moved by the inner differential speed support surface in a direction transverse to the direction of movement of the article moved by the inner differential speed support surface; and
    positioning said displaced articles in alignment with articles moved by said outer support surfaces by subjecting articles moved by said inner differential speed support surface to transverse forces in opposite directions whereby articles subjected to said forces will be displaced to opposite sides into linear alignment with articles moved by said outer support surfaces.

3. The method of claim 2 wherein said displacing and positioning steps are carried out substantially simultaneously.

* * * * *